Sept. 18, 1928.  1,684,944
A. W. CHAPMAN
SLIDABLE SEAT FOR VEHICLES AND THE LIKE
Filed July 31, 1926  5 Sheets-Sheet 1

Sept. 18, 1928.  1,684,944
A. W. CHAPMAN
SLIDABLE SEAT FOR VEHICLES AND THE LIKE
Filed July 31, 1926  5 Sheets-Sheet 5

INVENTOR
Arthur William Chapman
BY
Charles H. Kesler
his ATTORNEY

Patented Sept. 18, 1928.

1,684,944

UNITED STATES PATENT OFFICE.

ARTHUR WILLIAM CHAPMAN, OF LONDON, ENGLAND.

SLIDABLE SEAT FOR VEHICLES AND THE LIKE.

Application filed July 31, 1926, Serial No. 126,191, and in Great Britain July 15, 1925.

My invention relates to improvements in means for guiding movable members, such as seats or the like, from one position to another and for retaining the same against movement in certain of said positions; and the invention has for its object more particularly to provide a simple, reliable and efficient device which is inexpensive to produce and which may be conveniently installed or placed in position on a motor vehicle or elsewhere without unduly obstructing the floor or space receiving the same.

Further, said invention has for its object to provide a device of the character specified in which the seat or seats thereof adapted for motor vehicles, such as sedans, coupés and the like having a limited number of doors or entrances, may be readily shifted so that the passengers or occupants thereof may conveniently and comfortably enter or leave the vehicles through said doors or entrances.

Further, said invention has for its object to provide a device of the character specified in which the seat may be readily shifted from one position to another with very little effort on the part of the passenger or person moving the same.

Further, said invention has for its object to provide a device of the character specified in which the shiftable seat may be readily locked in certain of the positions thereof to retain the same rigidly in position, and readily released to permit of the free movement thereof.

Further, said invention has for its object to provide a device of the character specified in which the seat or sliding member and the guiding means therefor slidably interlock to maintain said seat against lateral movement from its line of travel and against separation from its guiding means, whereby to facilitate the movement of said seat from one position to another and to permit of the same being held rigidly in each position.

Further, said invention has for its object to provide a device of the character specified in which the locking means or anchoring member for said seat or shiftable member is continuously adjustable along the line of travel of said seat or shiftable member to vary the locking position thereof.

Further, said invention has for its object to provide a device of the character specified in which the locking means or anchoring member may be readily adjusted by the passenger or occupant of the seat while he is seated so as to position said seat, when the same is locked, in such position that the legs of the operator may be comfortably disposed in convenient relation to the pedals and other controls of the motor vehicle or the like.

Further, said invention has for its object to provide a device of the character specified in which the seat may be readily released manually from said adjustable anchoring member in each position thereof, and quickly shifted to a position permitting of the convenient entry and exit of the passengers or occupants of the vehicle, and then quickly returned to automatically lock with said anchoring member in the same position thereof without requiring readjustment of said anchoring member to the position found suitable for the particular occupant of the seat.

Further, said invention has for its object to provide a device of the character specified in which the adjustable locking or anchoring member is arranged to grip the guiding member therefor in each position thereof and to increase its gripping action in accordance with the stresses to be resisted, so that, should the same be left inadvertently in unsecured condition, any backward movement of the seat or movable member engaged therewith will cause said anchoring member to cant or tilt, and thus hold said seat or movable member rigidly in position.

Further, said invention has for its object to provide a device of the character specified in which the locking or anchoring member is continuously adjustable along the line of travel of the seat or shiftable member and may be readily secured rigidly in each position by the occupant of the seat and readily released.

Further, said invention has for its object to provide a device of the character specified in which the seat in certain positions thereof on its guiding means may be readily disengaged therefrom to permit of its removal from the vehicle or the like and readily replaced in interlocking engagement with said guiding means.

Further, said invention has for its object to provide a device of the character specified in which the guiding means slidably supporting the anchoring member for the seat also serves to guide said seat from one position to another relative to said anchoring member.

Further, said invention has for its object to provide a device of the character specified in which the parts may be readily secured to the uneven surfaces of the seat and floor or wall with the relatively slidable parts properly aligned to permit of the free movement thereof relative to each other without binding.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention.

Referring to the drawings (Figs. 1, 2, 4 and 7), the seat 1 (illustrated in broken lines) has a base or frame 2, or other part, to which at the bottom thereof is attached a part of the seat guiding and supporting means, including the rollers 3 secured to the opposite sides of the frame 2 and adapted to run on the strips or rails 4 secured to the floor of the vehicle and the guiding member 5 in the form of a channel piece having a dovetail groove or channel $5^a$ therein and secured by means of the bolts 6 to the rear part of said base 2 between the rollers 3. The guiding member 5 within the channel $5^a$ intermediate its ends is provided with recesses or slots 7 adapted to register with and receive a cooperating guiding means mounted on the floor or other part of the vehicle and adapted to ride within the dovetail channel $5^a$ of the member 5. This guiding means on the floor preferably consists of a base portion 8 attached by bolts 9 to the floor of the vehicle and a pedestal 10 having a reduced portion $10^x$ extending into the channel $5^a$ and horizontal surfaces $10^y$ on which the edges of the member 5 slides. The pedestal portion $10^x$ has formed thereon a guide element 11 corresponding in cross section with the dovetail groove or channel $5^a$ and adapted to be received therein through the slots 7, and to slidably fit the same. A tapering portion $11^A$ is formed on the top of the element 11 for guiding the same to facilitate the entry thereof into the channel $5^a$ of member 5 through the slots 7. A removable bolt or stop 12 extends through the channel member 5 near the slots or reduced portions 7 and is adapted to engage the pedestal 10 when the seat is moved to its rearmost position to prevent the element 11 from registering with the slots 7, whereby to normally maintain the parts 5 and 11 in interlocking sliding engagement against separation. The member or stop 12 may be readily removed through the frame member 2. When the stop 12 is removed the element 11 may be made to register with the slots 7 to permit of the separation of the parts.

An additional slide block or guiding member 14 is secured to the base member 2 of the seat at the front edge thereof and cooperates with and slidably engages a guiding member or slide rail 15 fixed to the floor in alignment with the channel member 5 and rear pedestal 10. In the form of the invention here illustrated the guiding member 15, like the member 5, consists of a channel piece having a dovetail channel or groove $15^x$ therein adapted to receive another guiding element 11 which is adapted to register with the slots or recesses $15^A$ to permit of the reception of the second element 11 into said channel $15^x$ in interlocking slidable engagement therewith to maintain the parts against separation. The member 14 includes a pedestal portion 10, like the corresponding portion 10 of the rear pedestal, which rests upon the edges of the channel member 15, as indicated at $10^y$. The member or element 11 of the guide block 14 is similar in shape to the corresponding element 11 of the rear pedestal 10. A fixed stop 16 near the slots $15^A$ serves to limit the backward movement of the seat so that when the seat is in its rearmost position (the stop 12 being removed) the elements 11 will exactly register with their respective recesses or slots 7 and $15^A$ to permit of the disengagement thereof from the guiding members 15 and 8 to remove the seat. When the stop 12 is in position the guiding elements 11 are prevented from registering with the slots 7 and 15^A.

Figures 1, 3:
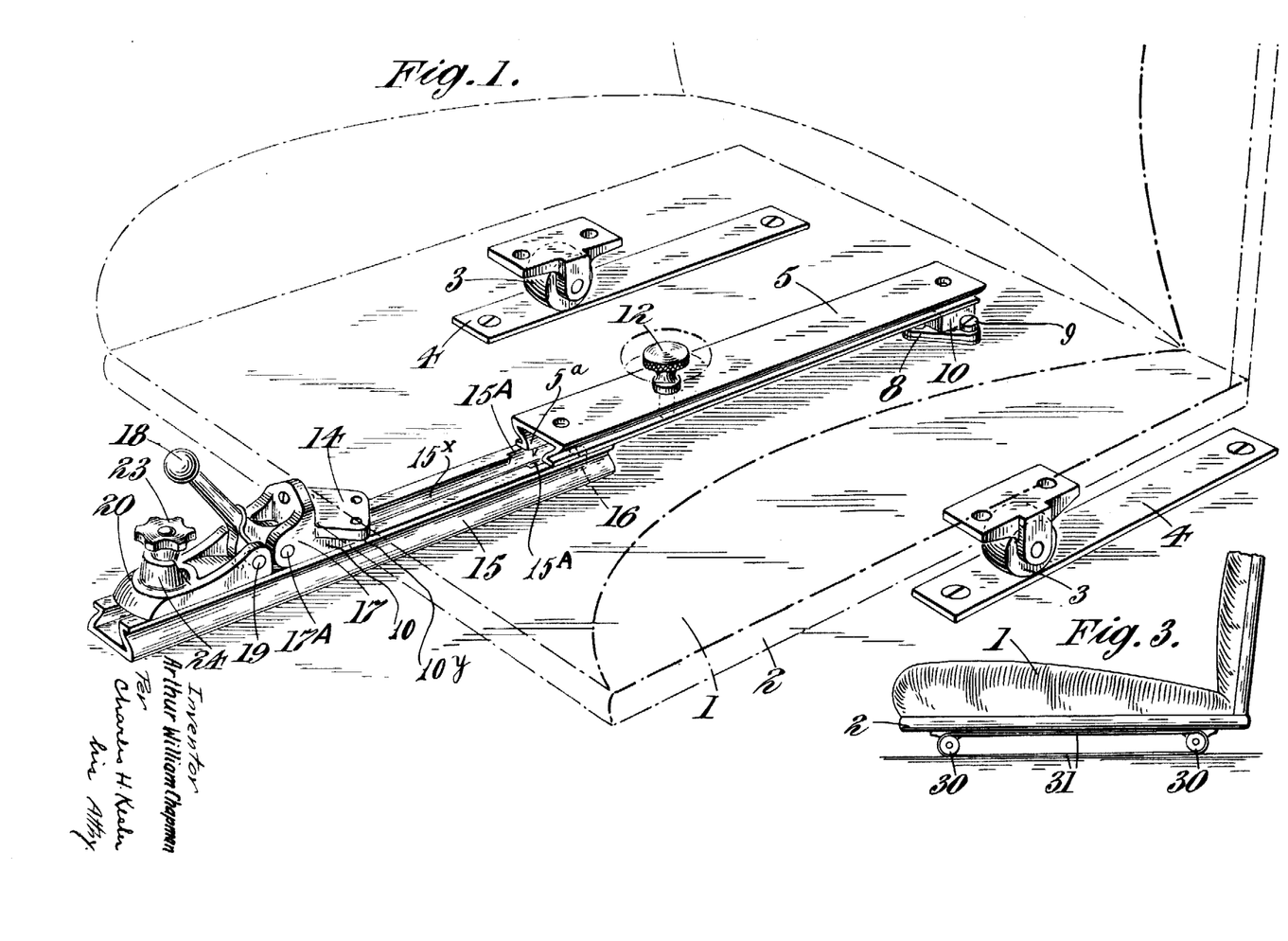
Figure 1 is a perspective showing one form of device constructed according to and embodying my said invention.
Fig. 3 is an elevation showing another form of runner or seat supporting arrangement.
Figure 2:
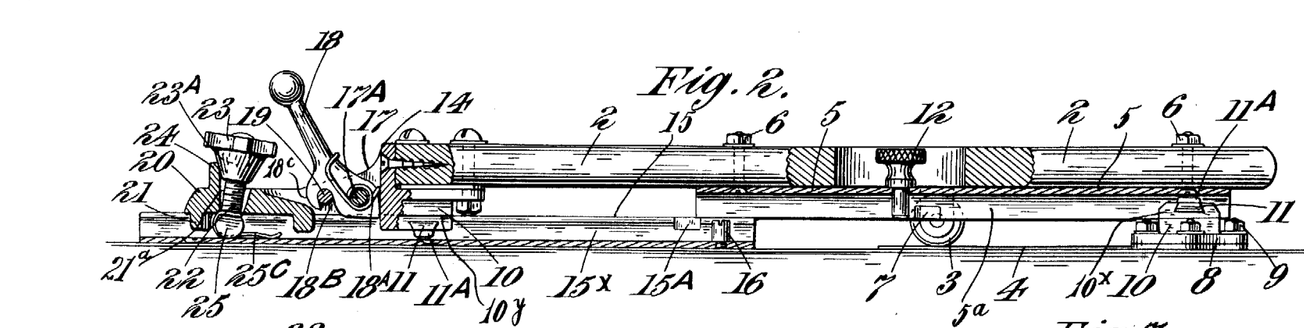
Fig. 2 is a side elevation thereof with parts in section.

The channel members 5 and 15 may overlap when the seat is in its forward position for use, as shown at Figs. 1 and 2. The seat is thus evenly supported and guided by the rollers 3 and by the guiding members 5 and 8, and 14 and 15, and is positively maintained thereby against lateral movement from its line of travel and against vertical movement.

Formed integrally with the guiding member 14 are forwardly projecting ears 17. Pivoted at 17^A between said ears 17 is a catch or locking member 18 normally held in depressed position by means of a spring 18^A, and having a catch slot 18^B therein adapted to receive a pin or studs 19 mounted upon a cooperating locking or anchoring member 20 likewise slidably engaging the guiding member 15. The catch 18 is provided with a cam-like guiding surface 18^C, which, when the seat is moved forwardly, engages the pin 19 and automatically actuates the catch 18 and guides the same into locking engagement with the pin 19 to hold the seat in position. The seat may be readily released by lifting the catch 18.

The anchoring element 20, which determines the locked position of the seat, is continuously adjustable to a plurality of positions on the guiding member 15 along the line of travel of the seat to vary the position at which the seat is to be locked. For this purpose the member 20 includes a portion 21 extending into the channel 15^x of the member 15 for suitably guiding the same, and means for locking or securing the same in each position. The locking means for the anchoring member 20 extends loosely through an opening 21^a in the anchoring member and, in the particular embodiment of the invention illustrated, includes a threaded stem 22 having a nut 23 threaded upon the upper projecting end thereof. The nut 23 has a conical portion 23^A adapted to engage the inner side of the semiannular upper portion or boss 24 on the anchoring member 20. The stem 22 has formed thereon at its lower end a head 25 loosely fitting within and conforming to the channel 15^x, the ends 25^A (Fig. 4) of said head 25 being formed angularly to conform to the inclination of the walls of the channel member 15. The round lower surface of said head 25 bears on the bottom surface of the channel 15^x. The spring 25^C serves to restore the stem 22 to its inoperative position when the nut 23 is loosened. When the nut 23 is tightened the anchoring member 20 is clamped down on the guiding member 15, and the stem 22 is simultaneously turned through a small angle, because of the conical portion 23^A bearing on the abutment 24, and this angular or tilting movement causes the head 25 to jam or grip firmly in the channel 15^x of the slide rail 15 to firmly secure the anchoring member 20 in each position. The member 20 may be readily released to permit of the adjustment thereof.

Figures 4, 5:
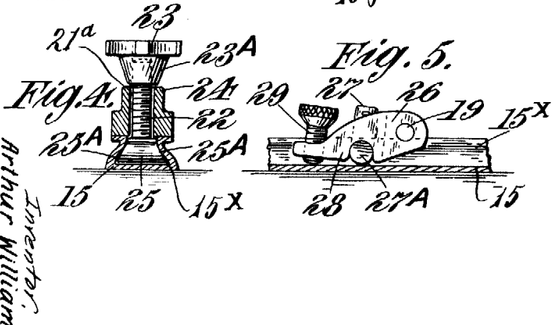
Fig. 4 is a detail transverse section of the locking or anchoring device shown at Figs. 1 and 2.
Fig. 5 is a detail view of a modified form of locking or anchoring device.

At Fig. 5 is shown another form of anchoring member, designated at 26, to which through the pin 19 the seat may be secured in any of a plurality of positions. The member 26, like the member 20, slidably engages the slide rail 15 and extends into the channel 15^x thereof. Rigidly associated with the member 26 is a T-bolt 27 having a head 27^A disposed within and fitting the channel 15^x, conforming in shape thereto. The member 26 has formed thereon an arm 28 through which is threaded a manually operable bolt or screw 29 adapted to bear on the bottom of the channel. When the screw 29 is tightened the body 26 slightly tilts or angularly moves, thereby causing the head 27^A within the channel 15^x to jam within or securely grip the channel member 15 to rigidly hold the anchoring member 26 in adjusted position.

At Fig. 3 is illustrated a modified form of guiding and supporting means which may be substituted for the rollers 3 and tracks 4 of Fig. 1, or which may be conveniently employed, for example, when the floor of the car is carpeted. In this form two rollers 30 are provided at each side of the seat base 2 and a suitable belt 31 is disposed around the rollers 30 forming an endless track support for the seat.

Figure 6:
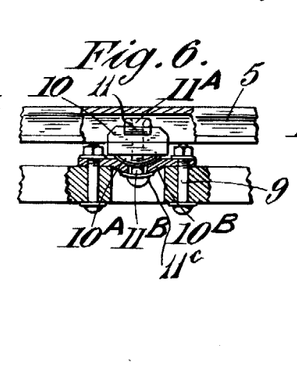
Fig. 6 is a detail section of a special mounting for a slide block.
Figure 7:
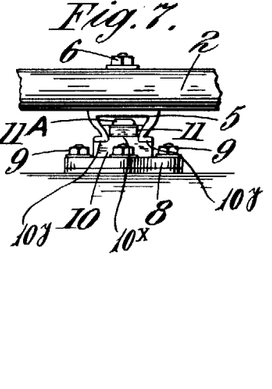
Fig. 7 is a detail end elevation showing a slide block engaged within a channel member.

At Fig. 6 is shown a modified form of rear guide block designed to overcome difficulties in securing proper alignment of the parts when the same are fitted or assembled whereby to permit of the free movement of the interlocking parts relative to each other without binding.

As illustrated the pedestal portion 10 has a convex lower portion 10^A adapted to be received within a concave plate 10^B secured to the floor by means of the bolts 9. The guiding element 11 having the portion 11^A thereon is secured to the part 10 by means of the bolt stem 11^B which passes through the part 10 and through a hole in the concave member 10^B the hole being of sufficient size to permit angular movement of the stem 11^B and part 10 relative to the member 10^B. The part 10 and bolt stem 11^B are retained in position by means of the concave head 11^C on the bolt working over the underside of the member 10^B.

Figure 8:
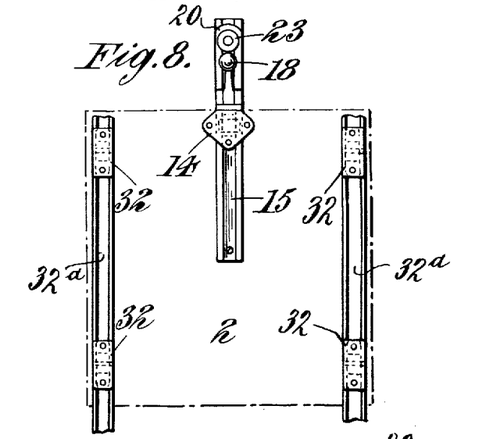
Figs. 8, 9, and 10 are plans of various layouts of slide and locking means for seats.
Figure 9:
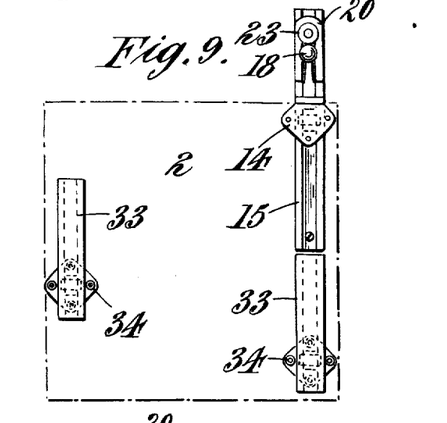
Figure 10:
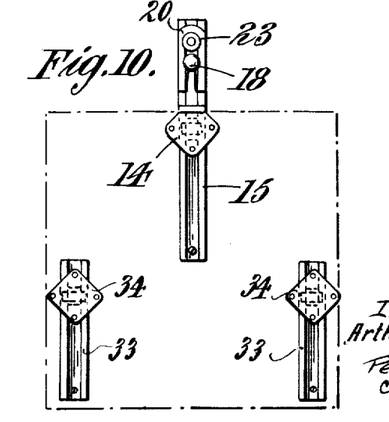

At Figs. 8, 9, and 10, I have illustrated a few of the various combinations or arrangements in which the different guiding and supporting means herein described may be assembled or fitted upon the floor or other part of the motor vehicle to meet the requirements of each installation, the type of guide rail 15 shown at Figs. 1 and 2 being employed, as one example, to illustrate the various arrangements and combinations.

At Fig. 8 the broken line indicates the seat base 2 at each corner of which is mounted a roller in a suitable mounting 32. The rollers travel in grooved tracks 32ª arranged upon the floor at opposite sides of the guide rail 15 thereon, the tracks 32ª serving to prevent lateral movement of the seat from its line of travel as the same is guided on the rail 15.

At Fig. 9 the seat base 2 carries at one side a channel member 33 slidably engaging the guide block 34 fixed to the floor, while a similar channel member 34 is attached to the seat base 2 at the opposite side in alignment with the guide rail 15 and slidably engages a guide block 34 on the floor, the seat being supported at three points.

At Fig. 10 another form of three point support is shown in which the guiding members 33 are secured to the floor at opposite sides of the guide rail 15 thereon. In this arrangement the guide blocks 34 are secured to the rear of the seat base 2 and slidably engage the members 33. In all of the arrangements above described, the guide blocks 14 are attached to the front of the seat base and slidably engage the slide rails 15. The seat in each arrangement is thus evenly supported at three or more points and is maintained against lateral movement in its travel to and from locking positions. The members 33 and 34, also slidably interlock as described in connection with Figs. 1 and 2, to prevent the separation thereof as the seat moves from one position to another, and the members 33, like the members 15, may be provided with removal recesses or slots to permit of the seats being disengaged therefrom and removed. The seat in its forward position may be locked by means of the catch 18 to the anchoring member 20 held in adjusted position by the manually operable member 23.

At Figs. 11 to 14 is illustrated another embodiment of my said invention which I at present consider the preferred form. As illustrated the guide rails for the seat in this form consists of one or more parallel rods or bars 35 and 36 of suitable cross section, preferably cylindrical in cross section. The rods or guide rails 35 and 36 are cheap and effective, and are readily secured in position upon the floor or other part of the vehicle by means of the bolts 37 at the ends thereof adapted to pass through the floor A. The rails 35 and 36 are suitably spaced from the floor by means of the distance washers 38 of the required thickness.

Brackets or slide cages 39 and 40 are secured to the bottom or other part of the seat 1 adjacent to the corners thereof, and are provided with ears 41 between which the slide blocks or members 42 are pivoted on transverse axes 43. Each slide block or member 42 is provided with a recess 44 conforming to and adapted to receive the slide rails 35 and 36, whereby the seat is supported on said rails in interlocking sliding engagement therewith to maintain said seat against separation therefrom and to maintain the same against lateral movement from its line of travel. The slide blocks 42, being pivoted, automatically align with the guide rails to run easily thereon without binding, and hence compensate longitudinally for inaccurate alignment of the parts due to inequalities of the floor board and seat. The rails 35 and 36, being cylindrical in cross section, permit of the engagement of the slides 42 therewith irrespective of slight differences in the spacing of said rails from the support on which the same are mounted.

Figure 11:
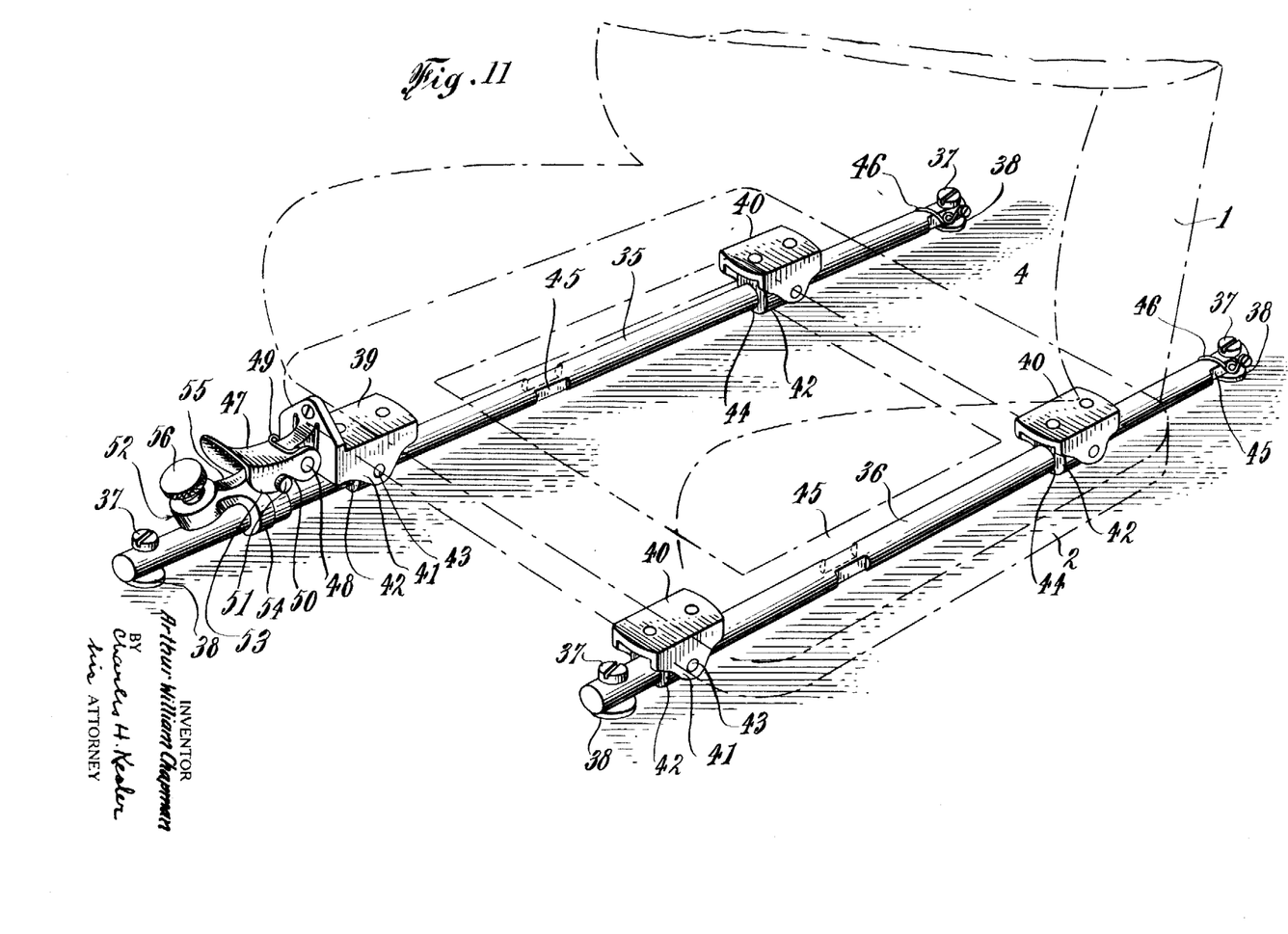
Fig. 11 is a perspective showing another form of device constructed according to and embodying my said invention.
Figure 12:
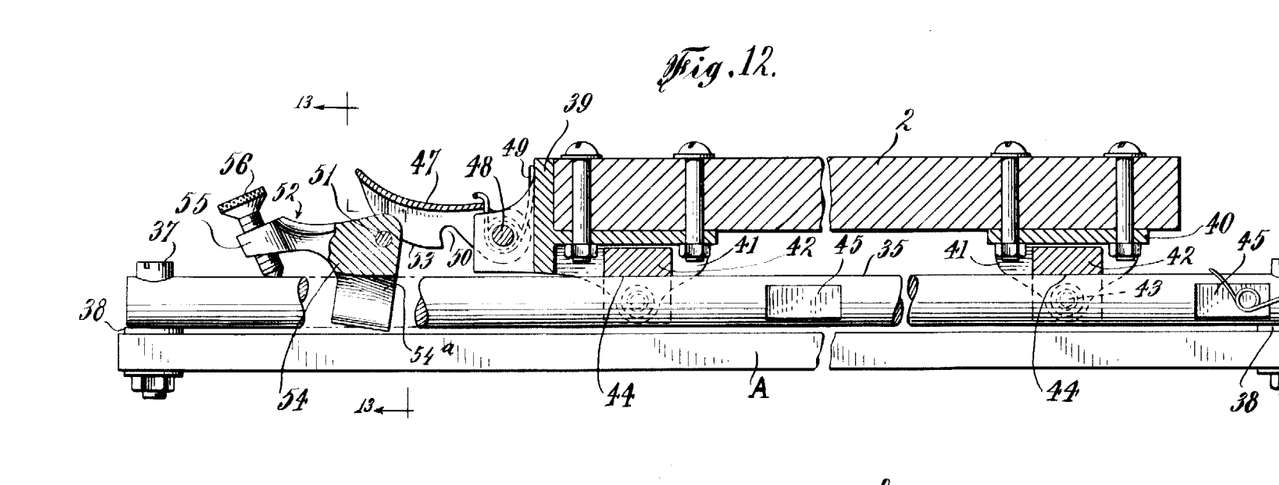
Fig. 12 is a longitudinal section thereof.

The seat together with the slide blocks 42 may be readily removed from the rails 35 and 36 by causing the slide blocks to register with the seat withdrawal slots or recesses 45 on the guide rails 35 and 36, forming reduced portions thereon. The seat may then be readily removed by lifting the same past the slots, and the same may be replaced in like manner. Spring members or clips 46 engage the rear ends of the rails 35 and 36 in proximity to the rear slots 45 in the path of travel of the seat to form a combined stop and buffer limiting the rearward movement of the seat, and normally preventing the slide blocks 42 from registering with the slots 45. When the members 46 are raised, the seat may be moved into alignment with the slots 45 to permit of the removal of the seat. The rear securing devices 37 also serve as stops to prevent the seat from sliding off of the rails at the rear thereof.

A suitable catch 47 is pivoted at 48 to the bracket 39 and is maintained normally depressed by means of the spring 49. The lateral flanges of the catch 47, which is preferably channel-shaped, are provided with recesses 50 adapted to receive the pin 51 disposed transversely upon the upper rear portion of an anchoring member or stop 52 which slidably embraces the slide rod 35 at the forward extended end thereof and is held thereon against separation. The forward portions of the lower edges 53 of the catch 47 constitute guiding means adapted to initially engage the pin 51 and guide said catch automatically into locking engagement therewith when the seat is moved to its forward position.

Figure 13:
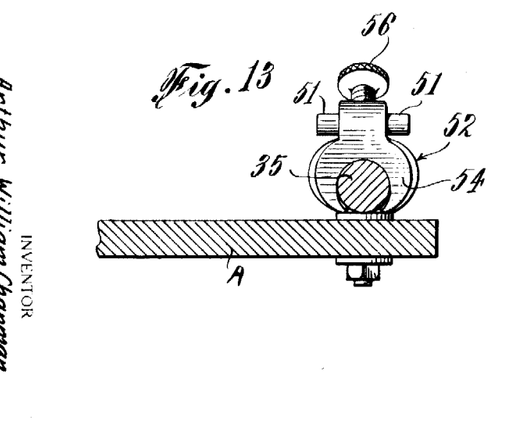
Fig. 13 is a detail transverse section on the line 13—13 of Fig. 12 looking at the anchoring member or locking device.
Figure 14:
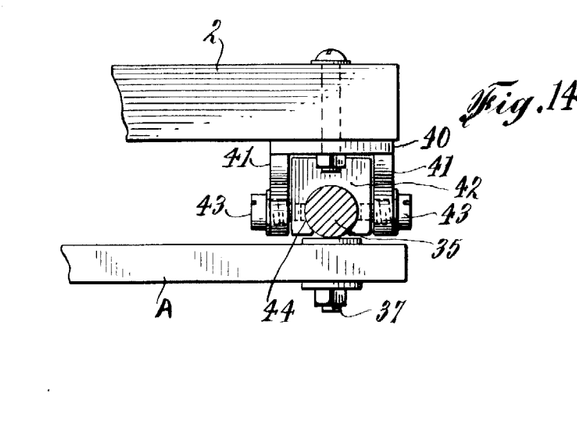
Fig. 14 is a detail transverse section through one of the rail engaging slides.

The anchoring member 52 includes a forked or claw-like portion or bridle 54 embracing and slidable upon the rail 35, and a forwardly extending arm or portion 55 having a threaded opening therein in which is threaded a finger bolt or thumb-screw 56 engaging at its inner end the slide rail 35. The opening within the portion 54 is such as to receive the rail 35, and the portion 54 so engages said rail as to prevent transverse movement of the member 52 thereon as an axis and to permit of a limited angular movement of the member 52 relative to the longitudinal axis of said rail.

In operation, the anchoring member 52, when the screw 56 is manually actuated to release the same, may be continuously adjusted along the rail 35 to any of a plurality of positions thereon so that the seat, when the same is locked to the member 52, will be in such position that the occupant's legs will be comfortably arranged in the most convenient position relative to the pedals or other controls of the motor car.

When the thumb-screw 56 is tightened, the anchoring member 52 cants or moves angularly so that the claw-like portion 54 thereof, and also the screw 56, binds upon or rigidly grips the rail 35 to securely lock the anchoring member thereto. The seat, when the same is locked to the anchoring member 52, is rigidly held hereby and by the guiding means therefor against movement in all directions.

Should the screw 56 be left loose inadvertently when the seat is locked to the anchoring member 52 any sliding movement or slipping of the seat backwards will cause said anchoring member 52 to automatically cant or tilt and firmly grip the rail to hold said seat against any further movement.

The tilting action of the anchoring member 52 is facilitated by imparting a rearwardly and upwardly extending taper to the rear central portion 54ª of the inner surface of the claw-like part 54 in engagement with the top of the rail 35 to slightly increase the size of the rail receiving opening of said part 54 at the rear compared to the forward portion of said opening, the tapering surface having a slightly shorter radius than that of the forward portion of said surface. The anchoring member 52 may be readily released by the manipulator thereof while he is seated and continuously adjusted to the desired position. The same is readily locked or unlocked by a slight movement of the fingers. The anchoring member 52 also serves as an adjustable stop or abutment in the path of travel of the seat to limit the movement thereof in one direction.

The upwardly projecting forward end of the catch 47 may be readily engaged by the fingers to release the seat to shift the same to a rear position to permit of the entry or exit of the passengers or occupants of the car. When the seat is returned into locked position, the catch 47 automatically engages the pin 51. The seat in its travel is firmly held in position on the guide rail or rails against lateral and vertical movement.

The operation of the device shown at Figs. 1 and 2 is also substantially like that of the device just described.

The devices embodying my said invention are inexpensive to manufacture, and may be readily and conveniently installed, modified, if desired, to meet the requirements of each installation, as illustrated at Figs. 8, 9, and 10. The devices occupy very little space and do not unduly obstruct the floor space or interfere with the controlling mechanism.

The anchoring member is continuously adjustable and may be manually actuated in each position to tilt and firmly grip the slide rail on which the same slides, and the same, even when unlocked, automatically cants to hold the seat against inadvertent movement, the gripping action increasing in accordance with the stresses to be resisted.

In my said invention, the anchoring member and seat are entirely separate. When the hook 47 is released the seat is free to run back to facilitate entry or exit, and the seat upon being returned to the chosen position is automatically locked there, thus the adjustment is not lost and the occupant, although he has moved the seat for temporary convenience, is assured that the seat upon its return will be locked in the precise position which he previously found to be suitable.

Further, although the seat has an interlocking sliding engagement with its slide rail or rails to maintain the same firmly in each position thereon, yet the same may be readily disengaged therefrom, when necessary, and removed to permit of access to the floor board for repairs, or to permit of the use of the seat outside of the car.

Having thus described my said invention what I claim and desire to secure by Letters Patent is:

1. A device of the character described comprising a guiding member, an anchoring member slidably mounted thereon to permit of the adjustment of the device for leg length, manually operable means carried by said anchoring member for securing the same in predetermined adjusted positions on said guiding member, a seat member movable along the line of travel of said anchoring member, and manually operable means for securing said seat member to said anchoring member in each position thereof and for releasing said seat to permit of the movement thereof relative to said anchoring member.

2. A device of the character described comprising an anchoring member, means for securing said anchoring member in a plurality of predetermined positions to permit of the adjustment of the device for leg length, a seat member slidable relative to said anchoring member, and manually operable means for positively locking said seat member to said anchoring member in position adjusted for leg length and for releasing said seat member to permit of the free sliding movement thereof relative to said anchoring member.

3. A device of the character described comprising a guiding member, an anchoring member slidable thereon to permit of the adjustment of the device for leg length, a manually operable member carried by said anchoring member and adapted to engage said guiding member for frictionally retaining said anchoring member in a plurality of predetermined positions thereon, a seat member movable relative to said anchoring member, means for guiding said seat member in its travel, and means for detachably securing said seat member to said anchoring member to retain said seat member in a predetermined position adjusted for leg length.

4. A device of the character described comprising a guiding rail, an anchoring member slidable thereon, means for securing said anchoring member thereon in a plurality of positions adjusted for leg length, a seat member slidably mounted on said rail and guided thereon relative to said anchoring member, and manually operable means for detachably securing said seat member to said anchoring member in the adjusted position thereof.

5. A device of the character described comprising a rail, a seat member slidable longitudinally of said rail, a member independent of said seat member slidable on said rail along the line of travel of said seat member and constituting an adjustable locating stop serving to limit the movement of said seat member in one direction, and means for locking said stop to said rail in a plurality of predetermined adjusted positions to permit of the adjustment of the device for leg length.

6. A device of the character described comprising a guiding member, an anchoring member slidable thereon and angularly movable into gripping engagement therewith, and means for tilting said anchoring member and maintaining the same in adjusted positions on said guiding member.

7. A device of the character described comprising a guiding member, an anchoring member slidable thereon and capable of limited tilting movement relative thereto, and a manually operable screw carried by said anchoring member and engaging said guiding member for angularly moving said anchoring member into gripping engagement with said guiding member.

8. A device of the character described comprising a guiding member, an anchoring member slidable thereon and having a limited angular movement relative thereto; said members having portions engaging each other to maintain the same against separation, manually adjustable means carried by said anchoring member for tilting the same to cause said engaging portions to frictionally grip each other to hold said anchoring member in adjusted positions, and a movable member adapted to engage said anchoring member to be held in position thereby; said member upon movement thereof in one direction serving to tilt said anchoring member to cause the same to automatically lock should said adjustable means be in unlocked position.

9. A device of the character described comprising a guiding member, an anchoring member slidable thereon and angularly movable relative thereto; said members having portions engaging each other to maintain said members against separation, manually operable means carried by said anchoring member at one end thereof and engaging said guiding member for tilting said anchoring member to cause the same at the opposite end thereof to frictionally engage said guiding member whereby said anchoring member is maintained in adjusted positions on said guiding member.

10. A device of the character described comprising a guiding member, an anchoring member slidable thereon and angularly movable relative thereto; said members having portions engaging each other to maintain the same against separation, manually operable means carried by said anchoring member at one end thereof and engaging said guiding member for tilting said anchoring member to cause the same at the opposite end thereof to frictionally grip said guiding member for maintaining said anchoring member in adjusted positions, and means on the upper portion of said anchoring member at said last named end for engagement with a member to be held in adjusted position by said anchoring member.

11. A device of the character described comprising a guiding member, an anchoring member slidable thereon and having a limited angular movement relative thereto; said members having portions engaging each other to maintain the members against separation, a manually operable threaded member extending through said anchoring member at one end thereof and adapted to engage said guiding member to tilt said anchoring member to cause said engaging portions thereof to frictionally grip each other, and studs projecting from the upper portion of said anchoring member at the opposite end thereof and adapted to be engaged by a member to be held in position by said anchoring member.

12. A device of the character described comprising a sliding seat member, an anchoring member, means for securing said anchoring member in a plurality of positions on the line of travel of said seat member, and a pivoted catch for locking said seat member to said anchoring member in each position thereof.

13. A device of the character described comprising a guiding member, an anchoring member slidable thereon, manually operable means for securing said anchoring member in a plurality of positions on said guiding member, a separate seat member slidable relative to said anchoring member, and movable means for securing said seat member to said anchoring member in each position thereof; said movable means being manually operable to release said seat member to permit of the free movement thereof relative to said anchoring member, and means associated with said movable means to cause the same to automatically lock said seat member to said anchoring member as said seat is moved into engagement therewith.

14. A device of the character described comprising a guiding member, an anchoring member slidable thereon, manually operable means for retaining said anchoring member in a plurality of positions on said guiding member, a member movable relative to said anchoring member, and a pivoted catch adapted to lock said last named member to said anchoring member in each position thereof.

15. A device of the character described comprising a guiding rail, an anchoring member slidable thereon, manually operable means carried by said anchoring member for securing the same to said rail in a plurality of positions, a seat member slidable relative to said anchoring member and guided in its travel on said rail, and a catch pivotally mounted on said seat member and adapted to engage said anchoring member to secure said seat member thereto in each position thereof.

16. A device of the character described comprising a slide rail, means for securing said slide rail in position, an anchoring member slidably embracing said slide rail and having a limited angular movement relative thereto, means carried by said anchoring member for tilting the same into gripping engagement with said rail to secure the same in a plurality of positions thereon, a sliding member for supporting a seat embracing said rail and slidable thereon independently of said anchoring member, and a pivoted catch carried by said sliding member and adapted to engage said anchoring member.

17. A device of the character described comprising a support, a seat movable on said support, an anchoring member adjustable on said support to a plurality of positions in the line of travel of said seat, a plurality of parallel sliding connections between the seat and the support serving to evenly support said seat and to maintain the same in its line of travel towards and from said anchoring member; certain of said connections including interlocking relatively slidable members serving to maintain said seat against movement laterally and against separation from said support, and means for securing said seat to said anchoring member in each position thereof.

18. A device of the character described comprising a plurality of parallel slide rails, a plurality of seat supporting members engaging said slide rails and slidable thereon, an anchoring member engaging certain of said slide rails and slidable thereon, means for securing said anchoring member in a plurality of positions on its slide rail, and a catch on an adjacent seat supporting member cooperating with said anchoring member to secure said seat against movement on said guide rails.

19. A device of the character described comprising a rod constituting a slide rail, an anchoring member embracing said rod and slidable thereon, means for clamping said anchoring member to said rod in a plurality of positions thereon, seat supporting members embracing said rod and slidable thereon, and means carried by certain of said seat supporting members adapted to engage said anchoring member to retain said seat in position.

20. A device of the character described comprising a plurality of parallel rods constituting guide rails, seat supporting members embracing said rods and slidably interlocking therewith to maintain said seat supporting members thereon against removal and lateral movement, an anchoring member embracing certain of said rods and slidable thereon, means for securing said anchoring member in adjusted positions on its rod, and means for detachably securing said seat to said anchoring member.

21. A device of the character described comprising a guide rail, separate members engaging said rail and slidable thereon, a seat, and a movable connection between said seat and each of said slide members to permit of said slide members evenly engaging said rail to slide freely thereon.

22. A device of the character described comprising a guide rail, a seat, brackets attached to said seat at the bottom thereof, and members pivoted to said brackets on axes extending transversely of said rail and slidably engaging said rail.

23. A device of the character described comprising a plurality of parallel guide rails, means for securing said rails to a support, a seat, brackets secured to said seat at the bottom thereof, and members movably supported on said brackets and slidably engaging said rails.

24. A device of the character described comprising a rod constituting a guide rail, a seat, brackets attached to said seat at the bottom thereof, members pivoted to said brackets on axes extending transversely of said rail; said members embracing said rail and slidably interlocking therewith to prevent lateral movement of said seat and the separation thereof from said rail during its sliding movement, an anchoring member slidably embracing said rail, means for securing said anchoring member in adjusted position thereon, and a catch pivoted to one of said brackets and adapted to engage said anchoring member.

25. A device of the character described comprising a slide rail, an anchoring member engaging said slide rail and adapted to slide along the same to permit of the adjustment of the device for leg length, means for securing said anchoring member in each of its predetermined adjusted positions, a seat member slidably interlocking with said slide rail, manually operable means for securing said seat member to said anchoring member in each predetermined adjusted position thereof and for releasing said seat member to permit of its independent travel on said guide rail, means on said seat member and said guide rail adapted to register with each other to permit of the engagement and disengagement of said seat member and said slide rail, and a stop on said rail for preventing the registration of said last named means.

ARTHUR WILLIAM CHAPMAN.

CERTIFICATE OF CORRECTION.

Patent No. 1,684,944.      Granted September 18, 1928, to

ARTHUR WILLIAM CHAPMAN.

It is hereby certified that error appears in the above numbered patent requiring correction as follows: Page 1, in the heading to the printed specification, line 4, date of filing application in Great Britain, for "July 15, 1925" read "August 15, 1925"; and the said Letters Patent should be read with this correction therein that the same may conform to the record of the case in the Patent Office.

Signed and sealed this 23rd day of October, A. D. 1928.

(Seal)

M. J. Moore,
Acting Commissioner of Patents.

said anchoring member in each of its predetermined adjusted positions, a seat member slidably interlocking with said slide rail, manually operable means for securing said seat member to said anchoring member in each predetermined adjusted position thereof and for releasing said seat member to permit of its independent travel on said guide rail, means on said seat member and said guide rail adapted to register with each other to permit of the engagement and disengagement of said seat member and said slide rail, and a stop on said rail for preventing the registration of said last named means.

ARTHUR WILLIAM CHAPMAN.

CERTIFICATE OF CORRECTION.

Patent No. 1,684,944.   Granted September 18, 1928, to

ARTHUR WILLIAM CHAPMAN.

It is hereby certified that error appears in the above numbered patent requiring correction as follows: Page 1, in the heading to the printed specification, line 4, date of filing application in Great Britain, for "July 15, 1925" read "August 15, 1925"; and the said Letters Patent should be read with this correction therein that the same may conform to the record of the case in the Patent Office.

Signed and sealed this 23rd day of October, A. D. 1928.

(Seal)

M. J. Moore,
Acting Commissioner of Patents.